United States Patent
Wang et al.

(10) Patent No.: US 7,467,191 B1
(45) Date of Patent: Dec. 16, 2008

(54) SYSTEM AND METHOD FOR FAILOVER USING VIRTUAL PORTS IN CLUSTERED SYSTEMS

(75) Inventors: Fang Wang, San Jose, CA (US); Herman Lee, Mountain View, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 981 days.

(21) Appl. No.: 10/672,260

(22) Filed: Sep. 26, 2003

(51) Int. Cl.
*G06F 15/177* (2006.01)
*G06F 11/00* (2006.01)

(52) U.S. Cl. .......................................... 709/221; 714/4
(58) Field of Classification Search ................. 709/223, 709/221, 229
See application file for complete search history.

(56) References Cited

U.S. PATENT DOCUMENTS

| | | | |
|---|---|---|---|
| 4,937,763 A | 6/1990 | Mott | |
| 5,067,099 A | 11/1991 | McCown et al. | |
| 5,157,663 A | 10/1992 | Major et al. | |
| 5,633,999 A | 5/1997 | Clowes et al. | |
| 5,781,770 A | 7/1998 | Byers et al. | |
| 5,812,748 A | 9/1998 | Ohran et al. | |
| 5,812,751 A | 9/1998 | Ekrot et al. | |
| 5,951,695 A | 9/1999 | Kolovson | |
| 6,119,244 A | 9/2000 | Schoenthal et al. | |
| 6,292,905 B1 | 9/2001 | Wallach et al. | |
| 6,625,749 B1 | 9/2003 | Quach | |
| 6,715,098 B2 * | 3/2004 | Chen et al. | 714/3 |
| 6,728,897 B1 | 4/2004 | Cramer et al. | |
| 6,760,304 B2 | 7/2004 | Uzrad-Nali et al. | |
| 6,763,479 B1 * | 7/2004 | Hebert | 714/4 |
| 6,775,702 B2 | 8/2004 | Oeda et al. | |
| 7,356,608 B2 * | 4/2008 | Rimmer | 709/239 |
| 2003/0110173 A1 * | 6/2003 | Marsland | 707/10 |
| 2003/0115350 A1 | 6/2003 | Uzrad-Nali et al. | |
| 2004/0064815 A1 | 4/2004 | Uzrad-Nali et al. | |
| 2004/0081087 A1 * | 4/2004 | Shea | 370/228 |
| 2004/0151188 A1 * | 8/2004 | Maveli et al. | 370/398 |
| 2004/0156393 A1 | 8/2004 | Gupta et al. | |
| 2004/0268017 A1 | 12/2004 | Uzrad-Nali et al. | |

OTHER PUBLICATIONS

Anupam Bhide, Elmootazbellah N. Elnozahy, Stephen P. Morgan, "A Highly Available Network File Server," Proceedings of the Winner 1991 USENIX Conference, Jan. 21-25, 1991, pp. 199-205.

* cited by examiner

*Primary Examiner*—Jeffrey Pwu
*Assistant Examiner*—Benjamin R Bruckart
(74) *Attorney, Agent, or Firm*—Cesari and McKenna LLP (57) ABSTRACT

A system and method for utilizing virtual ports associated with a physical port in a Fibre Channel adapter for use in a clustered storage system is disclosed. A plurality of virtual ports are created and associated with a physical port on a storage system. One of the virtual ports is utilized as a standby port to be used to assume the identity of a port associated with a failed storage system in the cluster. In the event of a failover operation, the standby port is activated and assumes the identity of the failed storage systems port. Data access requests previously directed to the failed storage system are received by the activated virtual port and processed by the surviving storage system.

15 Claims, 7 Drawing Sheets

| | |
|---|---|
| ADAPTER MODE | 405 |
| NUMBER OF VIRTUAL PORTS | 410 |
| VIRTUAL PORT DATABASE [ ] | 500 |
| LOOP TO VP INDEX [ ] | 415 |
| ⋮ | 420 |

FIG. 4

| | |
|---|---|
| STATE | 505 |
| MODE | 510 |
| HOST | 515 |
| NODE NAME | 520 |
| PORT NAME | 525 |
| LOOP ID | 530 |
| DEVICE ID | 535 |
| ⋮ | 540 |

SYSTEM AND METHOD FOR FAILOVER USING VIRTUAL PORTS IN CLUSTERED SYSTEMS

FIELD OF THE INVENTION

The present invention relates to clustered systems and, in particular, to failover of clustered storage systems using virtual ports.

BACKGROUND OF THE INVENTION

A storage system is a computer that provides storage service relating to the organization of information on writeable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of semantic level of access to files and file systems. Storage of information on a NAS system is typically deployed over a computer network comprising a geographically distributed collection of interconnected communication links, such as Ethernet, that allow clients to remotely access the information (files) on the file server. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an is extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (FCP) or TCP/IP/Ethernet (iSCSI). A SAN arrangement or deployment allows decoupling of storage from the storage system, such as an application server, and some level of storage sharing at the application server level. There are, however, environments wherein a SAN is dedicated to a single server. When used within a SAN environment, the storage system may be embodied as a storage appliance that manages data access to a set of disks using one or more block-based protocols, such as FCP.

One example of a SAN arrangement, including a multi-protocol storage appliance suitable for use in the SAN, is described in U.S. Patent Application Publication No. 2004/0030668 A1, published on Feb. 12, 2004, entitled MULTI-PROTOCOL STORAGE APPLIANCE THAT PROVIDES INTEGRATED SUPPORT FOR FILE AND BLOCK ACCESS PROTOCOLS by Brian Pawlowski et al.

It is advantageous for the services and data provided by a storage system, such as a storage appliance, to be available for access to the greatest degree possible. Accordingly, some storage systems provide a plurality of storage appliances organized as a cluster, with a property that when a first storage appliance fails, the second storage appliance is available to take over and provide the services and the data otherwise provided by the first storage appliance. When the first storage appliance fails, the second storage appliance in the cluster (the "partner") assumes the tasks of processing and handling any data access requests normally processed by the first storage appliance. One such example of a storage appliance cluster configuration is described in U.S. Pat. No. 7,260,737, issued on Aug. 21, 2007, entitled SYSTEM AND METHOD FOR TRANSPORT-LEVEL FAILOVER OF FCP DEVICES IN A CLUSTER, by Arthur F. Lent, et al., the contents of which are hereby incorporated by reference. In such a storage appliance cluster, an administrator may desire to take one of the storage appliances offline for a variety of reasons including, for example, to upgrade hardware, etc. In such situations, it may be advantageous to perform a "voluntary" user-initiated takeover operation, as opposed to a failover operation. After the takeover operation is complete, the storage appliance's data is serviced by its partner until a giveback operation is performed.

In certain known storage appliance cluster implementations, the transport medium is FC cabling utilizing the FCP protocol (SCSI embedded in FC) for transporting data. In known failover techniques involving clusters of storage appliances, each storage appliance in the cluster maintains two physical FC ports, namely an A port and a B port. The A port is typically active and, as such, is utilized for processing and handling data access requests directed to the storage appliance, while the B port is typically inactive and operates in a standby mode. However, when a failover situation occurs, the B port is activated and assumes the identity of the failed partner storage appliance. At that point, the B port receives and handles data access requests directed to the failed storage appliance. In this way, the surviving storage appliance may process requests directed to both the storage appliance and its failed partner storage appliance. Such a conventional FC failover is further described in the above-incorporated patent application entitled SYSTEM AND METHOD FOR TRANSPORT-LEVEL FAILOVER OF FCP DEVICES IN A CLUSTER.

A noted disadvantage of such failover configurations is the requirement for a second (or B) physical port on the storage appliance, which necessitates that an additional port be located on any switch or other routing hardware connecting the storage appliance to the FC network. As the B port typically operates in a standby mode for the vast majority of time, e.g., at all times except during a failover, the requirement for a second physical port ("port burn") not only increases the costs of the appliance and its associated routing hardware, but also increases the costs for a system administrator to establish and maintain such a clustered storage appliance configuration. In effect, the clustered storage appliance failover configuration requires twice as many physical ports on the storage appliances and switches as are normally needed. It is thus an object of the present invention to provide a system and method for reducing port burn in a clustered storage system.

SUMMARY OF THE INVENTION

The present invention overcomes the disadvantages of the prior art by providing a system and method for using virtual ports associated with a physical FC port of a storage system to reduce port burn in a clustered storage system. The clustered storage system comprises a plurality of storage systems interconnected by a cluster interconnect device wherein each storage system has a plurality of virtual ports associated with a physical port. Specifically, each storage system has a first virtual port coupled to one or more clients over a computer network and a second virtual port that is normally in a standby mode but may be activated to service data access requests directed to a failed storage system. Each storage appliance is further coupled to a plurality of disks. In response to failure of one of the storage appliances, a surviving storage appliance takes over and assumes data handling capabilities of the failed storage appliance by activating the second virtual port. This activated virtual port assumes one or more unique identifiers that were previously assigned to the failed storage appliance, thereby enabling the surviving storage appliance to assume the network identity of the failed storage appliance.

In the illustrative embodiment, the storage system is a multi-protocol storage appliance and the computer network is a Fibre Channel (FC) network. During initialization, each storage appliance creates a plurality of virtual ports associated with a physical FC port. The first virtual port is utilized for servicing data access requests directed to the storage appliance by its clients. The second virtual port operates in standby mode, waiting to be activated in the event of a failover situation. In such a failover situation, this later virtual port "assumes" the appropriate FC World Wide Port Name (WWPN) and World Wide Node Name (WWNN) unique identifiers associated with the failed storage appliance. After the second virtual port has assumed the network address of the failed storage appliance, block access requests that were originally directed to the failed storage appliance are directed to the second virtual port on the surviving storage appliance. Thus, to devices on the FC network, it appears as if the failed storage appliance was momentarily disconnected from the network.

BRIEF DESCRIPTION OF THE DRAWINGS

The above and further advantages of invention may be understood by referring to the following description in conjunction with the accompanying drawings in which like reference numerals indicate identical or functionally similar elements.

DETAILED DESCRIPTION OF ILLUSTRATIVE EMBODIMENTS

A. Clustered Storage System Environment

Figure 1:
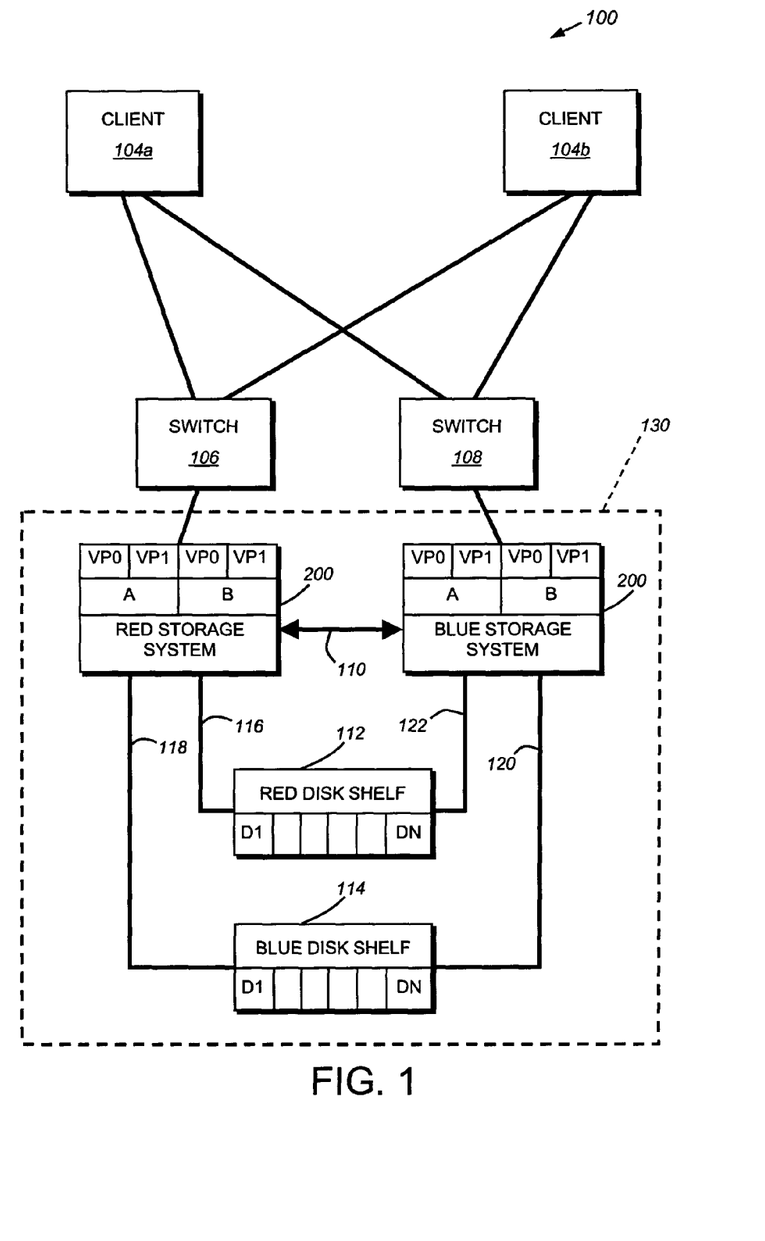
FIG. 1 is a schematic block diagram of a storage system cluster environment in accordance with an embodiment of the present invention.

FIG. 1 is a schematic block diagram of an exemplary network environment 100 in which the principles of the present invention are implemented. The network 100 includes several clients 104A, B interconnected with exemplary storage appliances 200, including Red Storage System and Blue Storage System, by FC switches 106 and 108.

A client 104 may be a general-purpose computer, such as a PC or a workstation, or a special-purpose computer, such as an application server, configured to execute applications over an operating system that includes block access protocols. Red Storage System 200a and Blue Storage System 200b are connected as two nodes of a storage system cluster 130. These storage systems, described further below, are illustratively embodied as storage appliances configured to control storage of and access to interconnected storage devices organized as disk shelves 112 and 114.

In the illustrated example, Red Storage System 200a is connected to Red Disk Shelf 112 by a data access loop 116. It should be noted that such a data access loop can be any acceptable networking media including, for example, a Fibre Channel Arbitrated Loop (FC-AL). Similarly, the Red Storage System 200a accesses Blue Disk Shelf 114 via counterpart data access loop 118. Likewise, Blue storage system accesses Blue Disk Shelf 114 via data access loop 120 and Red Disk Shelf 112 through counterpart data access loop 122. Each disk shelf in the cluster is coupled to each storage appliance, thereby providing redundant data paths between the storage system and disks in the event of a failover. It should be noted that the Red and Blue disk shelves are shown directly connected to storage systems 200 for illustrative purposes only. The disk shelves and storage systems may be operatively interconnected in any suitable FC switching network topology.

During normal cluster operation, the storage system that is connected to a disk shelf via the disk shelf's primary loop is the "owner" of the disk shelf and is primarily responsible for servicing data requests directed to blocks on volumes contained on that disk shelf. Thus, in this example, the Red storage system owns the Red Disk Shelf 112 and is primarily responsible for servicing data access requests for blocks contained on the disks of that shelf. Similarly, the Blue storage system is primarily responsible for the Blue disk shelf 114. When operating as a storage system cluster, each storage system is configured to take over and assume data handling capabilities for the other disk shelf in the cluster 130 in the event of a failure to the other "partner" storage system.

Connecting the Red and Blue storage systems is a cluster interconnect 110, which provides a direct communication link between the storage systems. The cluster interconnect can be of any suitable communication medium, including, for example, an Ethernet connection or a FC data link.

B. Storage Appliance

Figure 2:
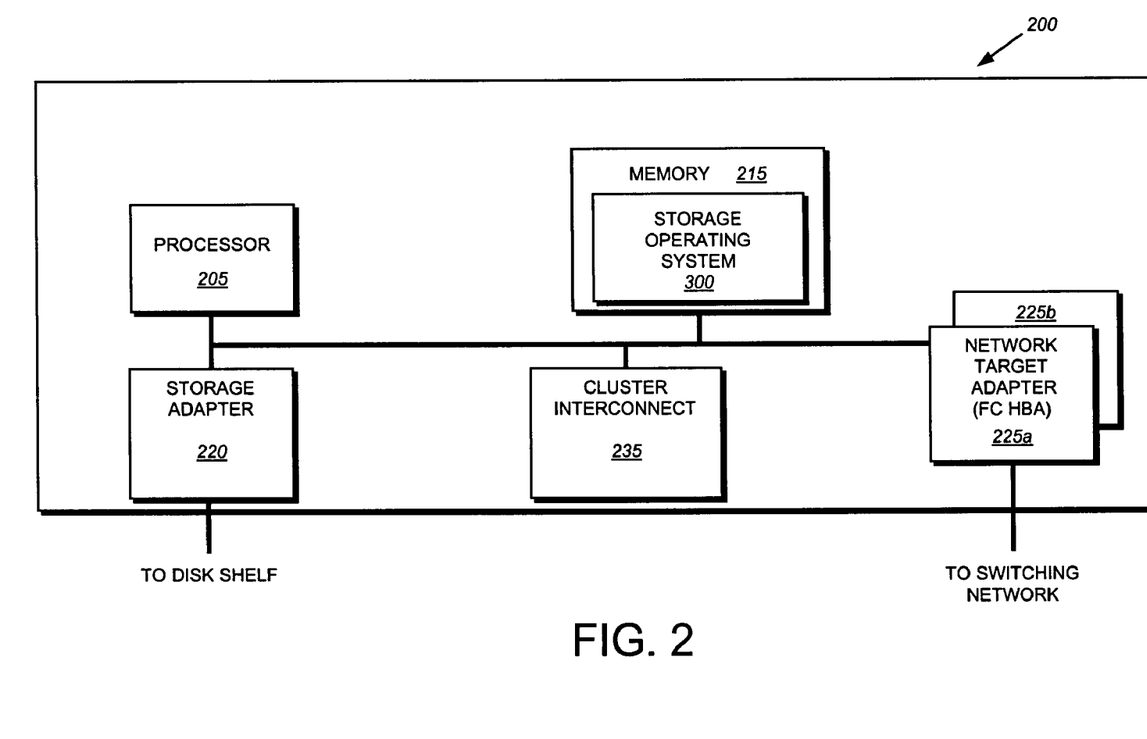
FIG. 2 is a schematic block diagram of an exemplary storage appliance in accordance with an embodiment of the present invention.

FIG. 2 is a schematic block diagram of an exemplary storage system 200 as used in cluster environment 100 and configured to provide storage service relating to the organization of information on storage devices, such as disks. The storage system 200 is illustratively embodied as a storage appliance comprising a processor 205, a memory 215, a plurality of network adapters 225a, 225b and a storage adapter 220 interconnected by a system bus 230. A storage appliance is a computer having features such as simplicity of storage service management and ease of storage reconfiguration, including reusable storage space, for users (system administrators) and clients of network attached storage (NAS) and storage area networks (SAN) deployments. The storage appliance may provide NAS services through a file system, while the same appliance provides SAN services through SAN virtualization, including logical unit number (lun) emulation. Multi-protocol storage appliances are further described in the above-referenced United States patent application entitled MULTI-PROTOCOL STORAGE APPLIANCE THAT PROVIDES INTEGRATED SUPPORT FOR FILE AND BLOCK ACCESS PROTOCOLS. The terms "storage system" and "storage appliance" are thus used interchangeably. The storage appliance 200 also includes a storage operating system 300 that provides a virtualization function to logically organize the information as a hierarchical structure of directory, file and virtual disk (vdisk) storage objects on the disks.

Whereas clients of a NAS-based network environment have a storage viewpoint of files, the clients of a SAN-based network environment have a storage viewpoint of blocks or disks. To that end, the multi-protocol storage appliance 200 presents (exports) disks to SAN clients through the creation of logical unit numbers (luns) or vdisk objects. A vdisk object (hereinafter "vdisk") is a special file type that is implemented by the virtualization function and translated into an emulated disk as viewed by the SAN clients. Such vdisks objects are further described in U.S. Pat. No. 7,107,365, issued on Sep. 12, 2006, entitled STORAGE VIRTUALIZATION BY LAYERING VIRTUAL DISK OBJECTS ON A FILE SYSTEM, by Vijayan Rajan, et al. The multi-protocol storage appliance thereafter makes these emulated disks accessible to the SAN clients through controlled exports, as described further herein.

In the illustrative embodiment, the memory 215 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

The network adapters 225a and *b* couple the storage appliance to a plurality of clients over point-to-point links, wide area networks (WAN), virtual private networks (VPN) implemented over a public network (Internet) or a shared local area network (LAN) or any other acceptable networking architecture. These clients 104 may be configured to access the information stored on the storage appliance as blocks or disks. For this SAN-based network environment, the storage appliance is coupled to an illustrative FC switch 106, 108. The network adapters 225 may comprise a FC host bus adapter (HBA) having the mechanical, electrical and signaling circuitry needed to connect the storage appliance 200 to the switch 106, 108. In addition to providing FC access, the FC HBA may offload FC network processing operations from the storage appliance's processor 205.

The clients may be general-purpose computers configured to execute applications over a variety of operating systems, including the UNIX® and Microsoft® Windows™ operating systems. The clients generally utilize block-based access protocols, such as the Small Computer System Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks, to attach to the storage appliance 200. In SCSI terminology, clients 104 operating in a SAN environment are initiators that initiate requests and commands for data. The multi-protocol storage appliance is thus a target configured to respond to the requests issued by the initiators in accordance with a request/response protocol. According to the FC protocol, initiators and targets have three unique identifiers, a Node Name, a Port Name and a Device Identifier. The Node Name and Port Name are worldwide unique. A Device Identifier is assigned dynamically by the FC port that it is attached to and is unique within a given FC switching fabric.

The appliance 200 supports various SCSI-based protocols used in SAN deployments, including SCSI encapsulated over TCP (iSCSI) and SCSI encapsulated over FC (FCP). The initiators (hereinafter clients 104) may thus request the services of the target (hereinafter storage appliance 200) by issuing iSCSI and/or FCP messages over the network 100 to access information stored on the disks. It will be apparent to those skilled in the art that the clients may also request the services of the integrated storage appliance using other block access protocols. By supporting a plurality of block access protocols, the storage appliance provides a unified and coherent access solution to vdisks/luns in a heterogeneous SAN environment.

The storage adapter 220 cooperates with the storage operating system 300 executing on the storage appliance to access information requested by the clients. The information may be stored on the disks or other similar media adapted to store information. The storage adapter includes I/O interface circuitry that couples to the disks over an I/O interconnect arrangement, such as a conventional high-performance, FC serial link or loop topology. The information is retrieved by the storage adapter and, if necessary, processed by the processor 205 (or the adapter 220 itself) prior to being forwarded over the system bus 230 to the network adapters 225a and *b*, where the information is formatted into packets or messages and returned to the clients.

Storage of information on the multi-protocol storage appliance 200 is, in the illustrative embodiment, implemented as one or more storage volumes that comprise a cluster of physical storage disks, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume is constructed from an array of physical disks that are organized as RAID groups. The physical disks of each RAID group include those disks configured to store striped data and those configured to store parity for the data, in accordance with an illustrative RAID 4 level configuration. However, other RAID level configurations (e.g. RAID 5) are also contemplated. In the illustrative embodiment, a minimum of one parity disk and one data disk may be employed. Yet, a typical implementation may include three data and one parity disk per RAID group and at least one RAID group per volume.

Figure 3:
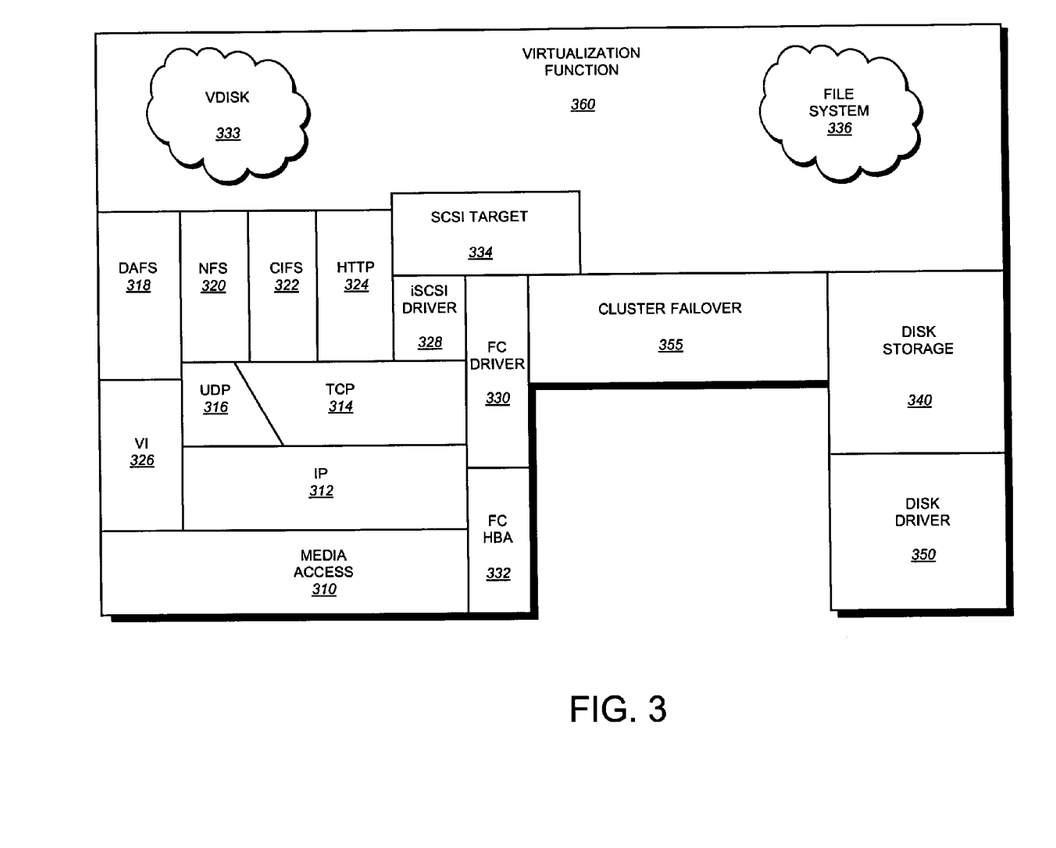
FIG. 3 is a schematic block diagram of an exemplary storage operating system for use with the exemplary storage appliance of FIG. 2 in accordance with an exemplary embodiment of the present invention.

To facilitate access to the disks, the storage operating system 300 implements a write-anywhere file system that cooperates with novel virtualization system code to provide a function that "virtualizes" the storage space provided by disks. The file system logically organizes the information as a hierarchical structure of directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization function allows the file system to further logically organize information as vdisks on the disks, thereby providing an integrated NAS and SAN appliance approach to storage by enabling file-based (NAS) access to the files and directories, while further emulating block-based (SAN) access to the vdisks on a file-based storage platform.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the storage appliance via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data associated with the emulated disk. The stream inode stores attributes that allow luns and exports to persist over, e.g., reboot operations, while also enabling management of the vdisk as a single disk object in relation to SAN clients.

C. Storage Operating System

In the illustrative embodiment, the storage operating system is the NetApp® Data ONTAP™ operating system that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

FIG. 3 is a schematic block diagram of the storage operating system 300 that may be advantageously used with the present invention. The storage operating system comprises a series of software layers organized to form an integrated network protocol stack or multi-protocol engine that provides data paths for clients to access information stored on the multi-protocol storage appliance using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A Virtual Interface (VI) layer 326 implements the VI architecture to provide direct access transport (DAT) capabilities, such as Remote Direct Memory Access (RDMA), as required by the DAFS protocol 318.

An iSCSI driver layer 328 provides block protocol access over the TCP/IP network protocol layers, while a FC driver layer 330 operates with the FC HBA 225 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 340 that implements a disk storage protocol, such as a RAID protocol, and a disk driver layer 350 that implements a disk access protocol such as, e.g., a SCSI protocol.

The FC driver 330 supports a plurality of virtual ports for each physical port on a HBA. One virtual port is typically used for processing data access requests directed to the storage appliance. A second virtual port may be used for failover, as described further below. A third virtual port may be utilized for proxying purposes as further described in U.S. patent application Ser. No. 10/811,095 entitled SYSTEM AND METHOD FOR PROXYING DATA ACCESS COMMANDS OVER A CLUSTER INTERCONNECT, by Herman Lee, et al.

Bridging the disk software layers with the integrated network protocol stack layers is a virtualization function 360 that is implemented by a file system 336 interacting with virtualization software embodied as, e.g., vdisk module 333 and SCSI target mode 334. The vdisk module 333 manages SAN deployments by, among other things, implementing a comprehensive set of vdisk (lun) commands that are converted to primitive file system operations ("primitives") that interact with the file system 336 and the SCSI target module 334 to implement the vdisks.

The SCSI target module 334, in turn, initiates emulation of a disk or lun by providing a mapping procedure that translates luns into the special vdisk file types. The SCSI target module is illustratively disposed between the FC and iSCSI drivers 328, 330 and the file system 336 to thereby provide a translation layer of the virtualization function 360 between the SAN block (lun) space and the file system space, where luns are represented as vdisks. By "disposing" SAN virtualization over the file system 336, the multi-protocol storage appliance reverses the approaches taken by prior systems to thereby provide a single unified storage platform for essentially all storage access protocols.

The file system 336 illustratively implements the Write Anywhere File Layout (WAFL) file system having an on-disk format representation that is block-based using, e.g., 4 kilobyte (KB) blocks and using inodes to describe the files. A further description of the structure of the file system, is provided in U.S. Pat. No. 5,819,292, titled METHOD FOR MAINTAINING CONSISTENT STATES OF A FILE SYSTEM AND is FOR CREATING USER-ACCESSIBLE READ-ONLY COPIES OF A FILE SYSTEM by David Hitz, et al., issued Oct. 6, 1998, which patent is hereby incorporated by reference as though fully set forth herein.

The storage operating system 300 further includes, in the illustrative embodiment, a cluster failover layer 355 that implements various failover features including initiating a failover. To that end, the cluster failover layer 355 monitors the cluster interconnect 110 for "heartbeat" signals sent between the storage appliances in the cluster. The heartbeat signals alert each storage appliance in the cluster that its partner storage appliance is operational.

D. Virtual Ports and FCP Failover

Each device attached to a FC network (e.g., FCHBA 225) has a unique World Wide Node Name (WWNN) which is illustratively a 64-bit value. Each FC device also has one or more associated physical ports, wherein each port has a unique 64-bit World Wide Port Name. Therefore, each FC device, such as FCHBA 225, is uniquely identified by a Node Name and one or more Port Names.

Figure 4:
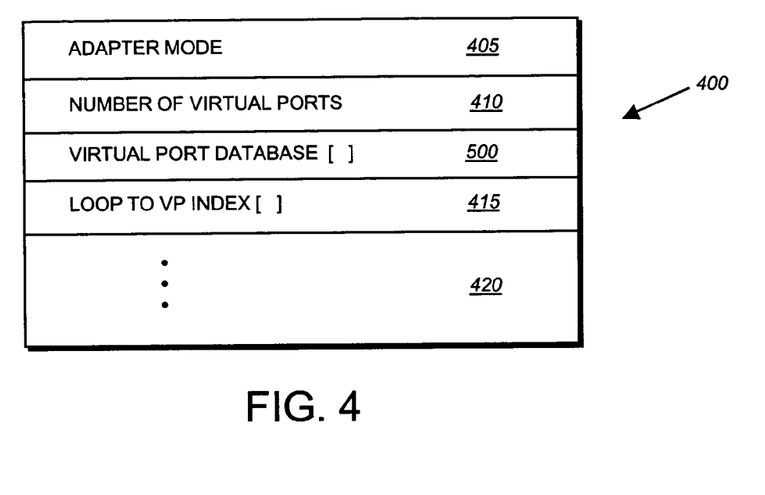
FIG. 4 is a schematic block diagram of an exemplary adapter block command structure in accordance with an embodiment of the present invention.

In accordance with the illustrative embodiment, each FC device (adapter) driver, for example FC driver 330, includes a control block data structure. An exemplary control block data structure 400 for FC driver 330 in accordance with an illustrative embodiment of the present invention is shown in FIG. 4. The control block data structure 400 includes an adapter mode field 405, number of virtual ports field 410, an array containing a virtual port database field 500, a loop to virtual port index array field 415 and, in alternate embodiments, additional fields 420. The adapter mode field 405 identifies whether the adapter (e.g., FCHBA 225) is operating in point-to-point (PTP) or multi-identifier (ID) mode. In point-to-point mode, each physical port is directly connected to another physical port on another FC device. When the adapter is operating in multi-ID mode, the storage appliance is connected to a switching fabric and therefore may require multiple virtual ports per physical port. The number of virtual ports field 410 identifies the number of virtual ports (VPs) associated with each physical port of the adapter. The virtual port database 500, described further below, contains an array of database entries, each containing information relating to a virtual port. The loop-to-VP index 415 contains a one-to-one mapping of target loop IDs to virtual point indexes. In accordance with the illustrative embodiment, each virtual port is associated with its own FC loop ID. Some commands passed to the adapter driver may include the target loop ID as an identifier. By utilizing the loop-to-VP index 415 the driver may transform the target loop ID into an appropriate virtual port index identifying the virtual port to handle the data access request.

Figure 5:
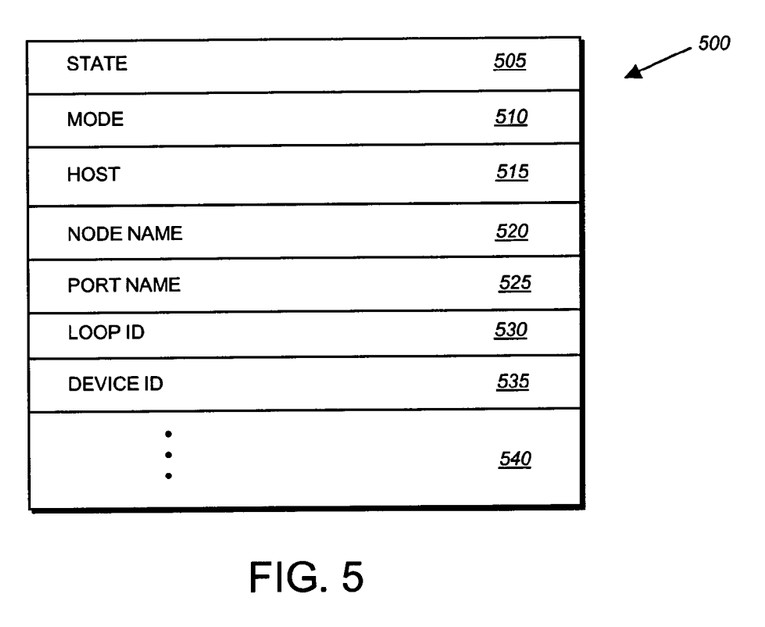
FIG. 5 is a schematic block diagram of an exemplary virtual port database entry in accordance with an embodiment of the present invention.

An exemplary entry of the virtual port database is shown in FIG. 5. The virtual port database entry 500 includes a state field 505, mode field 510, host field 515, node name field 520, port name field 525, loop ID field 530, device ID field 535 and, in alternate embodiments, additional fields 540. The state field 505 identifies the current state of the virtual port, e.g., ONLINE or OFFLINE. When in an ONLINE state, the virtual port is operational and services data access requests. An OFFLINE port may be one that is in a standby mode such as, for example, a virtual port awaiting a failover operation to occur to assume the identity of a failed storage appliance's port. The mode field 510 identifies the current mode of the virtual port. An exemplary current mode may include a LOCAL mode denoting that the virtual port is running as a local port servicing data access requests directed to the storage appliance. Alternate modes include, in the illustrative embodiment, a TAKEOVER mode denoting that the storage appliance has executed a failover or takeover operation and has assumed the identity of the partner's World Wide Node Name and World Wide Port Name. The host 515 field identifies the host on whose behalf the virtual port is running. For example, the virtual port may be assigned to run on behalf of a specified client 104 of the storage appliance. The node name field 520 identifies the current FC WWNN exported by the virtual port, whereas, the port name 525 field identifies the WWPN exported by that port. The WWPN and WWNN cooperate to provide a unique network address for the virtual port in the FC network. Note that each virtual port may be programmed to export a specific WWPN or WWNN. The loop ID 530 field identifies the loop ID assigned to the virtual port and the device ID 535 field identifies the FC unique device ID assigned to the virtual port. Note also that a FC Device ID is a unique identifier that is assigned to each FC device in a FC network.

Figure 6:
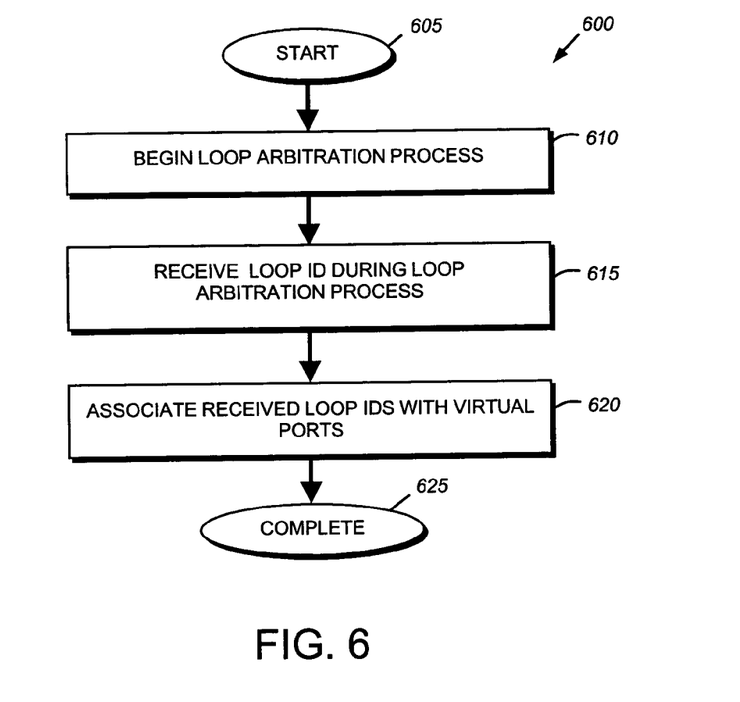
FIG. 6 is a flowchart detailing the steps of a procedure for initializing loop IDs in virtual ports in accordance with an embodiment of the present invention.

In the exemplary FC environment, loop IDs are assigned during loop arbitration among all of the ports within a FC switching fabric. In the illustrative embodiment each virtual port has its own unique loop ID, which causes the virtual port to appear to the FC switching fabric as a physical port connected to a FC loop. During initialization, the storage appliance obtains a set of loop IDs during loop arbitration. An exemplary flow-chart detailing the steps of a procedure 600 performed by the storage appliance when initializing loop IDs is shown in FIG. 6. The procedure begins in step 605 and continues to step 610 where loop arbitration begins. In step 615, each virtual port receives loop ID during the arbitration process. In step 620, the received loop IDs are associated with the virtual ports by, for example, inserting their loop IDs into the loop ID field 530 of the appropriate virtual port database entries 500. The procedure then completes in step 625. Each virtual port is thus associated with an appropriate FC loop ID for the network.

Figure 7:
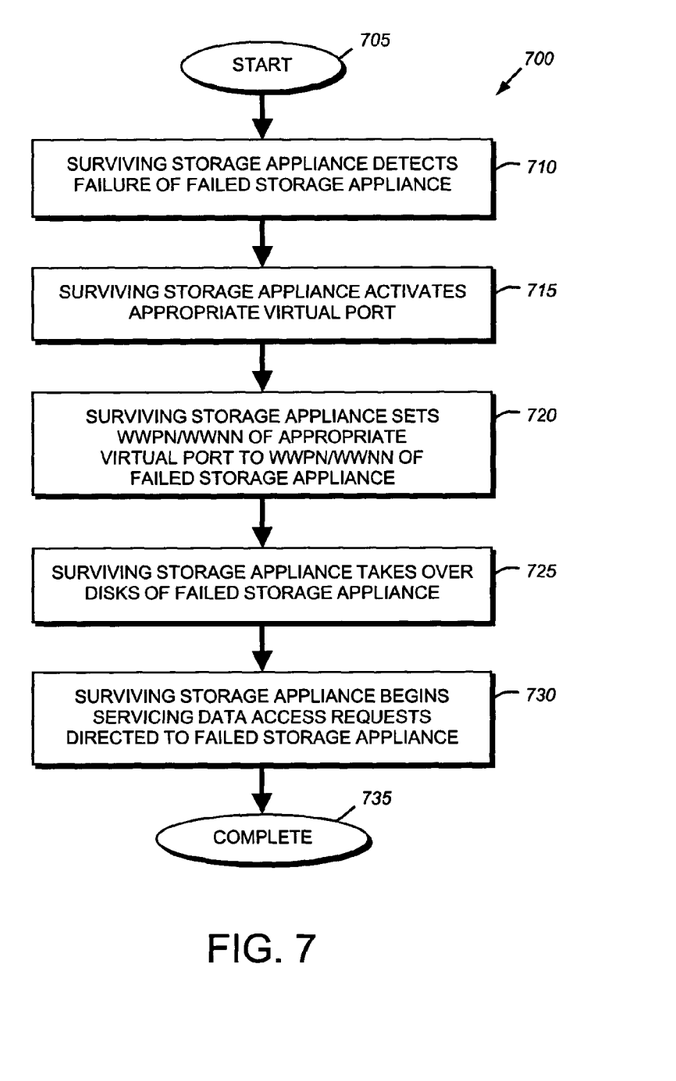
FIG. 7 is a flowchart detailing the steps of a failover procedure using virtual ports in accordance with an embodiment of the present invention.

FIG. 7 is a flowchart illustrating steps of a procedure 700 for failover of devices using virtual ports in a clustered configuration, according to an illustrative embodiment of the present invention. The failover procedure starts in step 705 and proceeds to step 710, where a surviving storage appliance detects a failure of a failed storage appliance in the cluster configuration. As used herein, the term "surviving storage appliance" refers to the storage appliance that remains operational after the failure condition. Similarly, the term "failed storage appliance" refers to the storage appliance that has become inoperative either due to an error condition or administrator action. It should be noted that in alternate embodiments, an administrator can initiate a failover procedure (or a takeover), for example, during scheduled maintenance on a storage appliance. As used herein, the term "failover" should be taken to include both a failover due to an error condition and a user-initiated takeover operation. In the illustrative embodiment, a failure is detected when the surviving storage appliance detects that the heartbeat signals of the failed storage appliance have ceased. Upon detecting the failure condition, the surviving storage appliance, activates its appropriate virtual port in step 715. The virtual port that is activated is, in the illustrative embodiment, the virtual port that was configured in an OFFLINE mode during system initialization. Step 715 thus transitions, the virtual port from OFFLINE to ONLINE mode. In step 720, the surviving storage appliance sets the WWPN and WWNN of the activated virtual port to the appropriate WWPN and WWNN of the failed storage appliance. At this point, the virtual port on the surviving storage appliance is configured as if it were the port on the failed storage appliance and is ready to begin accepting data access requests directed to the failed storage appliance.

In step 725, the partner storage appliance takes over the disks of the failed storage appliance using conventional disk ownership routines. One such routine is described in U.S. Pat. No. 7,296,068, issued on Nov. 11, 2007, entitled SYSTEM AND METHOD FOR TRANSFERRING VOLUME OWNERSHIP IN NETWORKED STORAGE, by Joydeep Sen Sarma, et al., the teachings of which are hereby incorporated by reference. Once it has obtained control of the disks, the partner storage appliance begins servicing requests directed to the failed storage appliance (step 730). The failover procedure then completes at step 735. At this point the surviving storage appliance processes data access requests for itself and (via the second virtual port) for the failed storage appliance.

Figure 8:
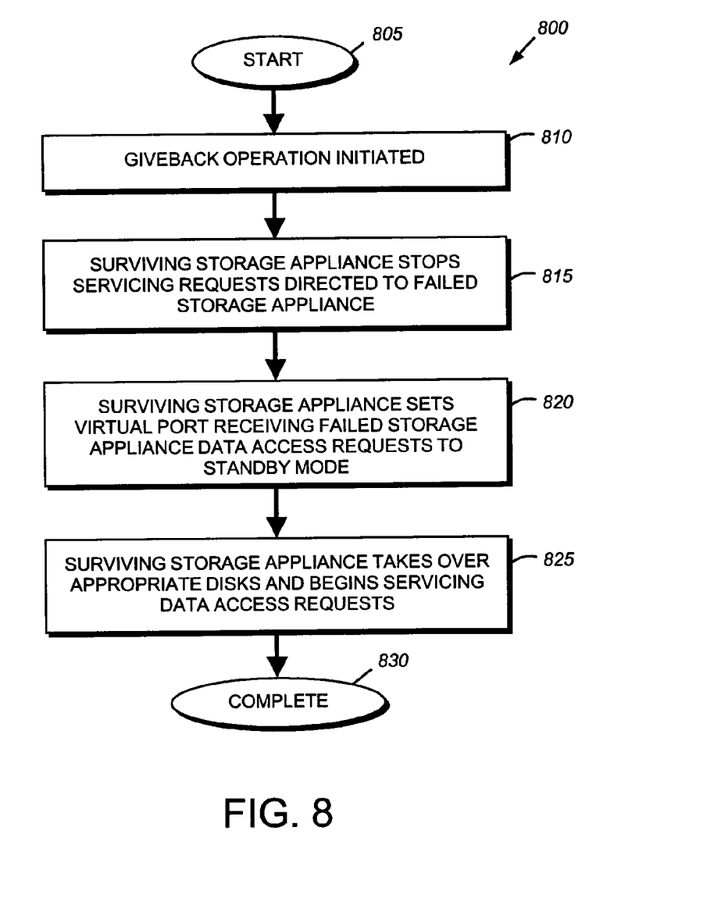
FIG. 8 is a flowchart detailing the steps of a giveback procedure in accordance with an embodiment of the present invention.

Once the failure or other error condition has been corrected, an administrator or user may cause the partner storage appliance to execute a giveback operation to transfer control of the disks that were taken over by the partner storage appliance back to the recovered failed storage appliance. FIG. 8 is a flowchart illustrating the steps of an exemplary giveback procedure 800. The procedure 800 begins at step 805 and proceeds to step 810, where the giveback operation is initiated by an administrator or user of the system entering a command in, for example, a command line interface (CLI) or by selecting an option in a graphical user interface (GUI) that is operatively interconnected with the storage appliance and storage operating system. In an alternate embodiment, the recovered failed storage appliance alerts the surviving storage appliance that a giveback command should be initiated. In response to the initialization of the giveback procedure, the surviving storage appliance, in step 815, stops servicing requests directed to any virtual ports that were configured (via the failover procedure) to handle requests previously directed to the failed storage appliance. The partner storage appliance then sets those virtual ports to an OFFLINE mode in step 820. At this point, the recovered failed storage appliance, takes over its appropriate disks and begins servicing data access requests is (step 825). The procedure then completes at step 830 and accordingly, both storage appliances in the cluster are operational and servicing data access requests directed to them.

To again summarize, the present invention provides a system and method for utilizing virtual ports in a clustered system to reduce port burn. Specifically, a plurality of virtual ports are created and associated with a physical port of each storage appliance of the cluster system. A first virtual port operates in an active mode to handle data access requests directed to the storage appliance and a second virtual port operates in a standby mode. In the event of a failure and subsequent takeover of a storage appliance, the second virtual port of the surviving storage appliance is utilized to handle data access requests directed to the failed storage appliance. During the takeover operation, the surviving storage appliance activates the second virtual port and sets its appropriate identification so that it assumes the identity of the physical port associated with the failed storage appliance. In the illustrative embodiment, the second virtual port is assigned the World Wide Port Name and World Wide Node Name that were associated with the appropriate physical port of the failed storage appliance.

The foregoing description has been directed to specific embodiments of this invention. It will be apparent, however, that other variations and modifications may be made to the described embodiments, with the attainment of some or all of their advantages. Specifically, it should be noted that any number of HBAs may be utilized in accordance with the invention. Additionally, any number of virtual ports may be associated with a given physical port. The procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method, comprising:
   detecting a failure of a primary virtual port on a physical port of a first server, wherein the primary virtual port has an identity;
   activating a secondary virtual port on the physical port of the first server, the physical port configured to support two or more virtual ports that share the physical port;
   configuring the secondary virtual port with the identity of the failed primary virtual port by setting a node name of the secondary virtual port to a node name of the primary virtual port, wherein the node name is unique to the first server, and setting a port name of the secondary virtual port to a port name of the primary virtual port; and
   servicing one or more storage devices owned by the first server through the secondary virtual port on the first server.

2. The method of claim 1, wherein detecting the failure is in response to initiating a failover procedure during a scheduled maintenance on the first server.

3. The method of claim 1, wherein detecting a failure in the first server further comprises: detecting a lack of a heartbeat signal from the first server at a second server.

4. The method of claim 1, further comprising:
   determining that the primary virtual port has been recovered;
   terminating service requests to the secondary virtual port;
   deactivating the secondary virtual port; and
   servicing the storage devices owned by the first server through the primary virtual port.

5. The method of claim 1 wherein the storage network comprises a Fibre Channel (FC) network and wherein the node name comprises a FC World Wide Node Name.

6. The method of claim 1 further comprising processing, by the first server, data access requests directed to the secondary virtual port.

7. The method of claim 6 further comprising processing, by the first server, data access requests directed to a third virtual port, the third virtual port also associated with the physical port.

8. The method of claim 1, wherein the secondary virtual port is in standby mode prior to the failure on the primary virtual port.

9. A computer readable medium including program instructions when executed operable to:

detecting a failure of a primary virtual port on a physical port of a first server, wherein the primary virtual port has an identity;

activating a secondary virtual port on the physical port of the first server, the physical port configured to support two or more virtual ports that share the physical port;

configuring the secondary virtual port with the identity of the failed primary virtual port by setting a node name of the secondary virtual port to a node name of the primary virtual port, wherein the node name is unique to the first server, and setting a port name of the secondary virtual port to a port name of the primary virtual port; and servicing one or more storage devices owned by the first server through the secondary virtual port on the first server.

10. The computer readable medium of claim 9 wherein the storage network comprises a Fibre Channel (FC) network and wherein the node name comprises a FC World Wide Node Name.

11. The computer readable medium of claim 9 further comprising processing, by the first server, data access requests directed to the secondary virtual port.

12. The computer readable medium of claim 11 further comprising processing, by the storage server, data access requests directed to a third virtual port, the third virtual port is associated with the physical port.

13. The computer readable medium of claim 9, wherein the secondary virtual port is in standby mode prior to the failure on the primary virtual port.

14. A storage server, comprising a physical port configured to communicate with a client over a network;

a plurality virtual ports associated with the physical port, wherein there is at least one primary virtual port and a secondary virtual port; and a storage operating system executed by a processor, the processor configured to: (i) detect a failure in the primary virtual port, the primary virtual port having an identity, (ii) in response to detecting the failure, activate the secondary virtual port, (iii) configure the secondary virtual port with the identity of the failed primary virtual port by setting a node name of the secondary virtual port to a node name of the primary virtual port, wherein the node name is unique to the first server, and setting a port name of the secondary virtual port to a port name of the primary virtual port, and (iv) service one or more storage devices owned by the storage server through the secondary virtual port on the storage server.

15. The storage server of claim 14, wherein the secondary virtual port is in standby mode prior to the failure on the primary virtual port.

\* \* \* \* \*

UNITED STATES PATENT AND TRADEMARK OFFICE
CERTIFICATE OF CORRECTION

PATENT NO. : 7,467,191 B1 Page 1 of 1
APPLICATION NO. : 10/672260
DATED : December 16, 2008
INVENTOR(S) : Fang Wang It is certified that error appears in the above-identified patent and that said Letters Patent is hereby corrected as shown below:

Col. 1, Line 58, please amend as shown:

devices. The SAN may thus be viewed as an [[is]] extension to a

Signed and Sealed this

Third Day of August, 2010

David J. Kappos
*Director of the United States Patent and Trademark Office*